(12) United States Patent
Wang et al.

(10) Patent No.: US 12,518,029 B2
(45) Date of Patent: Jan. 6, 2026

(54) CALLBACK WITH A PIGGYBACK FUNCTION TO SET UP SECURITY CONTEXT

(71) Applicant: Oracle International Corporation, Redwood Shores, CA (US)

(72) Inventors: Mincai Andrew Wang, Fremont, CA (US); Chao Liang, San Ramon, CA (US); Tanvir Ahmed, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 867 days.

(21) Appl. No.: 17/733,039

(22) Filed: Apr. 29, 2022

(65) Prior Publication Data

US 2023/0351030 A1 Nov. 2, 2023

(51) Int. Cl.
*G06F 21/60* (2013.01)
*H04L 9/40* (2022.01)

(52) U.S. Cl.
CPC ............ *G06F 21/604* (2013.01); *H04L 63/08* (2013.01)

(58) Field of Classification Search
CPC ............................... G06F 21/604; H04L 63/08
USPC .......................................................... 726/4
See application file for complete search history.

(56) References Cited

U.S. PATENT DOCUMENTS

| 2002/0111942 | A1 | 8/2002 | Campbell |
| 2003/0101116 | A1 | 5/2003 | Rosko |
| 2005/0038828 | A1 | 2/2005 | Kaluskar |
| 2006/0026286 | A1 | 2/2006 | Lei |
| 2007/0027896 | A1 | 2/2007 | Newport |
| 2007/0283021 | A1 | 12/2007 | Wong |
| 2010/0169377 | A1 | 7/2010 | Galeazzi |
| 2010/0202455 | A1* | 8/2010 | Sundaram ........... H04L 63/0428 455/435.1 |
| 2010/0318570 | A1 | 12/2010 | Narasinghanallur |
| 2013/0086652 | A1 | 4/2013 | Kavantzas |
| 2013/0110770 | A1* | 5/2013 | Stevelinck ............ G06F 16/214 707/609 |

(Continued)

OTHER PUBLICATIONS

U.S. Appl. No. 14/315,288, filed Jun. 25, 2014, Final Office Action, Mar. 30, 2016.

(Continued)

*Primary Examiner* — Teshome Hailu
(74) *Attorney, Agent, or Firm* — Hickman Becker Bingham Ledesma LLP; Stephen J. Walder, Jr.

(57) ABSTRACT

Under Backend Application Session Management ("BASM"), a DBMS not only creates an application session but also the respective adjunct security context to which to attach the adjunct security context. The middle tier does not need to create the application session or its adjunct security context. Instead, the middle tier sends an end-user token that the middle tier piggybacks to database requests that are sent through database connections. The end-user token identifies an end user and has been authenticated by the middle tier. The generation of the end-user token is concomitant to the process of the middle tier authenticating the end user. The DBMS invokes a user-defined function to generate an adjunct security context. The user-defined function generates the adjunct security context based on the end-user token. Application developers can customize the user-defined function to customize backend security for their needs.

20 Claims, 6 Drawing Sheets

(56) References Cited

U.S. PATENT DOCUMENTS

2014/0331337 A1    11/2014  Factor
2015/0379257 A1    12/2015  Ahmed
2015/0379293 A1    12/2015  Wang
2020/0112515 A1*    4/2020  Brar .................... H04L 63/10
2023/0085163 A1*    3/2023  Ballal .................. G06F 16/213
                                                        707/722

OTHER PUBLICATIONS

U.S. Appl. No. 14/315,288, filed Jun. 25, 2014, Office Action, Sep. 4, 2015.
U.S. Appl. No. 14/315,280, filed Jun. 25, 2014, Office Action, Mar. 29, 2016.
U.S. Appl. No. 14/315,280, filed Jun. 25, 2014, Notice Of Allowance, Dec. 14, 2016.
U.S. Appl. No. 14/315,280, filed Jun. 25, 2014, Final Office Action, Jul. 15, 2016.
Ahmed, U.S. Appl. No. 14/315,288, filed Jun. 25, 2014, Office Action, Apr. 26, 2017.
Ahmed, U.S. Appl. No. 14/315,288, filed Jun. 25, 2014, Notice of Allowance, Jun. 19, 2018.
Ahmed, U.S. Appl. No. 14/315,288, filed Jun. 25, 2014, Final Office Action, Dec. 27, 2017.

* cited by examiner

CALLBACK WITH A PIGGYBACK FUNCTION TO SET UP SECURITY CONTEXT

RELATED APPLICATIONS

The present application is related to U.S. patent application Ser. No. 14/315,280, entitled Integrating A User's Security Context In A Database For Access Control, filed on Jun. 25, 2014 by Mincai Wang, et al., the entire contents of which are incorporated herein by reference. The present application is related to U.S. patent application Ser. No. 14/315,288, entitled Asserting Identities Of Application Users In A Database System Based On Delegated Trust, filed on Jun. 25, 2014 by Tanvir Ahmed, et al., the entire contents of which are incorporated herein by reference.

FIELD OF THE INVENTION

The present disclosure relates to providing database security for databases used by applications.

BACKGROUND

Large databases are used to keep track of information required for companies, governmental entities, or other organizational entities to operate. Many of the large databases are accessible through an application operating in an N-tier architecture. The N-tier architecture comprises the following main tiers: a database management system (DBMS), a middle tier, and an end tier. Applications executing in the end tier access the DBMS through applications executing in the middle tier. Each of these three main tiers may themselves comprise multiple tiers.

The applications in the end tier are referred to herein as end-user applications. Often, end-user applications are connected to a mid-tier application via the Internet or an Intranet; mid-tier applications are often connected to a DBMS through more private networks. For example, a mid-tier application and a DBMS may be hosted in a data center and are connected to each other via a network private to the data center. End-user applications can interact with the mid-tier application through the Internet or other broadband network.

The term end tier is used hereafter to refer to one or more applications in the end tier. The term middle tier is used hereinafter to refer to one or more applications in the middle tier.

The end tier sends "end-user requests" to the middle tier to service. Servicing end-user requests requires that the middle tier access the database by issuing database requests to the DBMS, database requests such as requests to execute a query or to modify a row in a table.

Accessing a DBMS requires a database session on a database server of the DBMS. Creating a database session requires significant overhead. Such overhead includes authentication and procuring and preparing DBMS resources for the database session, such as a database process for servicing database requests, memory needed by the database process to service database requests, and a session security context that specifies access privileges for any database request serviced by the database process.

The session security context of a database session should reflect the database access privileges of the entities on whose behalf database requests are made through the database session. These entities may include the end user that initiated end-user requests to the middle tier, as well as a mid-tier application that issued the database request.

Connection Pooling

Typically, a mid-tier application servicing an end-user request entails the mid-tier application issuing a series of database requests to a database server of the DBMS. A mid-tier application can service multitudes of end-user requests that require database requests to service. Creating a database session for each would cause substantial overhead. An approach that reduces such overhead is referred to herein as connection pooling.

In connection pooling, a "connection pool" of database connections is created and maintained by the middle tier. Each database connection in the connection pool is a connection to a database session on a database server. When a mid-tier application services an end-user request that requires a database session to which to send a series of one or more database requests, the application "checks out" a database connection from the connection pool, uses the database connection to send the series of database requests to the DBMS, and then "checks in" the database connection to the connection pool once the series of database requests has been processed.

The database sessions to which database connections in a connection pool are connected are referred to as base database sessions. Base database sessions are used to process database requests issued on behalf of many end users and are thus used to service end users that have a wide and varying range of database access privileges. Therefore, base database sessions are created with a sweeping level of database privileges which are "adjusted" to an end user when used to service the end user. Specifically, the database privileges of a base database session are restricted and tailored to an end-user when checking out the database connection to the base database session. A powerful mechanism that is used for such restricting and tailoring of base database sessions is application session augmentation.

Application Session Augmentation

Application session augmentation creates "application sessions" that restrict and tailor database privileges for end users. An application session includes an adjunct session state that is created for an end user; the adjunct session state also includes an "adjunct security context" that may be created for and tailored to an end user or as otherwise needed. Through an operation referred to herein as session attachment, adjunct session state becomes part of a base database session state, thereby altering the configuration of the base database session, including database privileges associated with the base database session.

The term "application session" as used herein has several senses. The term is used herein to refer to an "unattached" adjunct session state that is not attached to a database session because adjunct session state represents a database session that may be established through session attachment and that is configured in effect according to the adjunct session state. In this unattached form, the application session may merely be data stored in a memory. The term "application session" also refers to a database session to which the respective adjunct security context has been attached. In this form, the application session is a database session that includes database processes and other resources that a database session may have.

Mid-Tier Application Session Management

An approach for implementing application session augmentation is the Mid-tier Application Session Management ("MASM") approach. Under MASM, the middle tier manages the creation and session attachment of application sessions on the database server and also generates a cached version of the application session (i.e., adjunct session state) for use by the middle tier. Similar to session attachment performed on a database server, when a database connection is checked-out, a cached application session is attached to the database connection. A mid-tier application in the middle tier may also use the adjunct security context of the application session to manage access to a DBMS.

MASM provides a multi-tier approach to DBMS security. An adjunct security context can be used by both the middle tier and the DBMS to enforce security policies according to the adjunct security context, which leads to redundant enforcement of the security policies that bolsters the security of the DBMS. The DBMS may protect itself from lapses that occur at the middle tier that violate security policies embodied in an adjunct security context. Enforcement of security policies by the DBMS is referred to herein as backend security, and enforcement of security by other tiers in a multi-tier architecture, such as the middle tier, is referred to herein as outer-tier security.

Before creating an application session for an end-user, the middle tier first authenticates an end-user. After authenticating the end-user, the middle tier creates the application session by performing a number of operations. First, the middle tier calls (e.g., through a remote procedure call) the DBMS to create an initialized application session at the DBMS. The DBMS creates the initialized application session and returns an application session identifier to the middle tier. At this stage, the application session at the DBMS is an initialized state and does not yet include an adjunct security context.

Next, the middle tier generates a cache copy of the application session, which includes an adjunct security context. The middle tier then calls the DBMS to populate the application session at the DBMS, which includes incorporating an adjunct security context to the application session. Next, the middle tier calls the DBMS to direct the DBMS to attach the application session to a base database session. Finally, the middle tier attaches the cached application session to a database connection in a connection pool and checks out the database connection to the end user.

After the end-user finishes using the checked-out database connection, the middle tier detaches the database connection from the cached application session on the middle tier and then checks in the database connection to the connection pool. The middle tier also calls the DBMS to direct the DBMS to detach the application session from the base database session.

Overhead Delays of MASM

MASM suffers from various overhead delays, the greatest of which include the delay that accompanies the remote calls by the middle tier to the DBMS to prepare and attach an application session. These include the middle tier call to create an initialized application session, the call to populate the adjunct security context, and the call to attach the application session.

Various measures may be used to help reduce the overhead. Once created, an application session and its cached version in the middle tier are retained by the DBMS and middle tier, respectively, for re-use for subsequent end-user requests from the respective end user. However, this measure becomes less effective as the number of mid-tier servers in the middle tier increases, as explained further below.

Overhead Incurred by Multi-Server Middle Tiers

Middle tiers often comprise multiple mid-tier servers. It is possible that once an application session is created for an end user by a particular mid-tier server in the middle tier, a subsequent end-user request by the end user is received at another mid-tier server in the middle tier while the application session is being retained by both the particular server and the DBMS. Despite the fact that the application session is being retained at a particular mid-tier server, the other mid-tier server may create another application session. The overhead delay that accompanies remote calls by the middle tier to the DBMS to prepare and attach an application session is thus multiplied in this way.

Such overhead delay may be mitigated by various measures. For example, mid-tier servers may share information about what application sessions are currently being retained. Rather than recreating an application session for multiple end-user requests, a mid-tier server uses the shared information to first determine whether an application session is being retained by another mid-tier server for the end user. If so, the mid-tier server retrieves the cached application session on the other mid-tier server to store and use for the end-user. However, even these measures of mitigation require overhead in the form of remotes calls and sharing of information between multiple mid-tier servers.

The overhead delay is more tolerable in mid-tier implementations that have a few mid-tier servers. However, the overhead becomes far less tolerable or even intolerable in implementations with a greater number of mid-tier servers. Mid-tier implementations in the cloud computing environment include numerous mid-tier servers.

Outer-Tier Security Shifts to the End Tier

In general, outer-tier security is implemented by application software in the outer-tiers. In a cloud computing environment, the execution of application software has shifted from the middle tier to the end tier. MASM creates application sessions in the middle tier. In a cloud computing environment, the value and usefulness of creating the application sessions in the middle tier are diminished if not eliminated, even though backend security provided through MASM remains useful. Therefore, there is a need to provide backend security in a multi-tier environment that does not rely on managing and creating application sessions in the middle tier as in MASM.

DETAILED DESCRIPTION

In the following description, for the purposes of explanation, numerous specific details are set forth in order to provide a thorough understanding of the present invention.

It will be apparent, however, that the present invention may be practiced without these specific details.

General Overview

Described herein is an approach referred to as Backend Application Session Management ("BASM"). Under BASM, the DBMS not only creates the application session but also the respective adjunct security context. The middle tier does not need to create the application session or its adjunct security context.

Instead, the middle tier sends a token that the middle tier piggybacks to database requests that are sent through database connections. The token referred to herein as an end-user token typically identifies an end user and has been authenticated by the middle tier. The generation of the end-user token is concomitant to the process of the middle tier authenticating the end user.

The DBMS invokes a user-defined function to generate an adjunct security context. The user-defined function generates the adjunct security context based on the end-user token. Application developers can customize the user-defined function to customize backend security for their needs.

BASM eliminates overhead attendant to MASM. Such elimination of overhead includes the elimination of remote procedure calls made to create an initialized application session, to populate the adjunct security context, and to attach an application session to a base database connection.

Multi-Tier System

Figure 1:
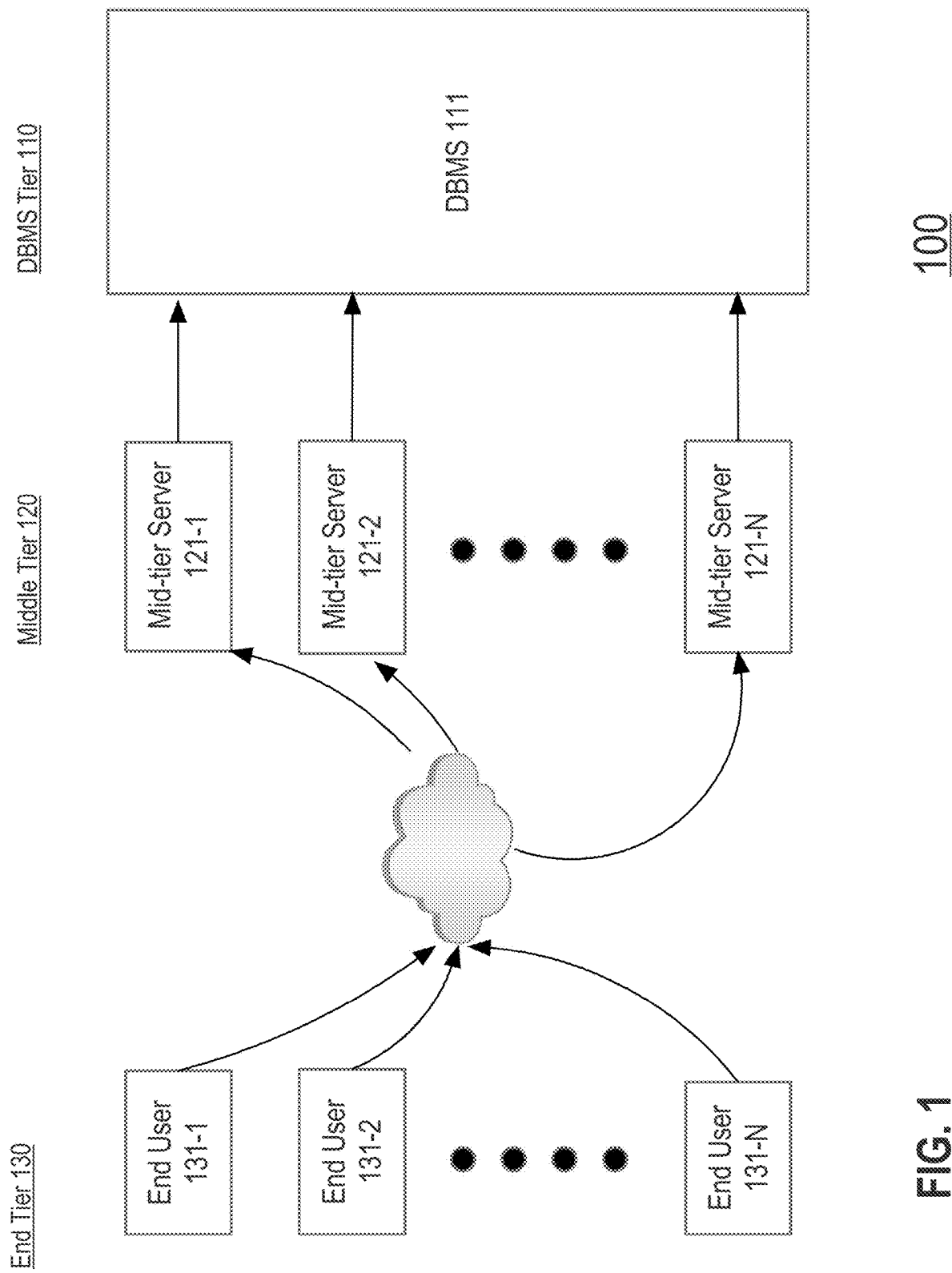
FIG. 1 is a diagram that depicts an illustrative multi-tier architecture according to an embodiment of the present invention.

FIG. 1 depicts an example Multi-tier System Architecture 100, an illustrative multi-tier architecture according to an implementation of BASM. Multi-tier System Architecture 100 includes DBMS Tier 110, Middle Tier 120, and End Tier 130. DBMS Tier includes DBMS 111, Middle Tier 120 includes Mid-tier Servers 121-1, 121-2 through 121-N, which are collectively referred to herein as Mid-tier Servers 121. End Tier 130 includes End User 131-1, 131-2, 131-3, which are collectively referred to as End Users 131.

Each of End Users 131 submits end-user requests to one or more of Mid-tier Servers 121. An end user is a computer system process executing an end-user application. The end user may authenticate itself with Middle Tier 120 according to an authentication protocol. End-user requests may be HTTP requests that are transmitted over the Internet to Mid-tier Servers 121. An end-user application may be a browser or browser-enabled application. The present invention is not limited to an end user that is executing any particular kind of application.

According to an embodiment, Mid-tier Servers 121 are connected to DBMS 111 through a private network. For example, Mid-tier Servers 121 may be co-located with DBMS 111 in a cloud computing environment within a data center and be interconnected via a private network of the data center. End Users 131 cannot connect directly with DBMS 111 but instead must connect with Middle Tier 120.

In response to receiving end user requests, Mid-tier Servers 121 sends database requests to DBMS 111 through database connections from a connection pool, the databases connections providing a connection over the private network between Mid-tier Servers 121 and DBMS 111. One example technology that may be used to establish a connection with DBMS 111 and submit database requests is Java Database Connectivity (JDBC). Other (e.g., non-Java-based) connection technologies may be used to establish a database connection.

Figure 2:
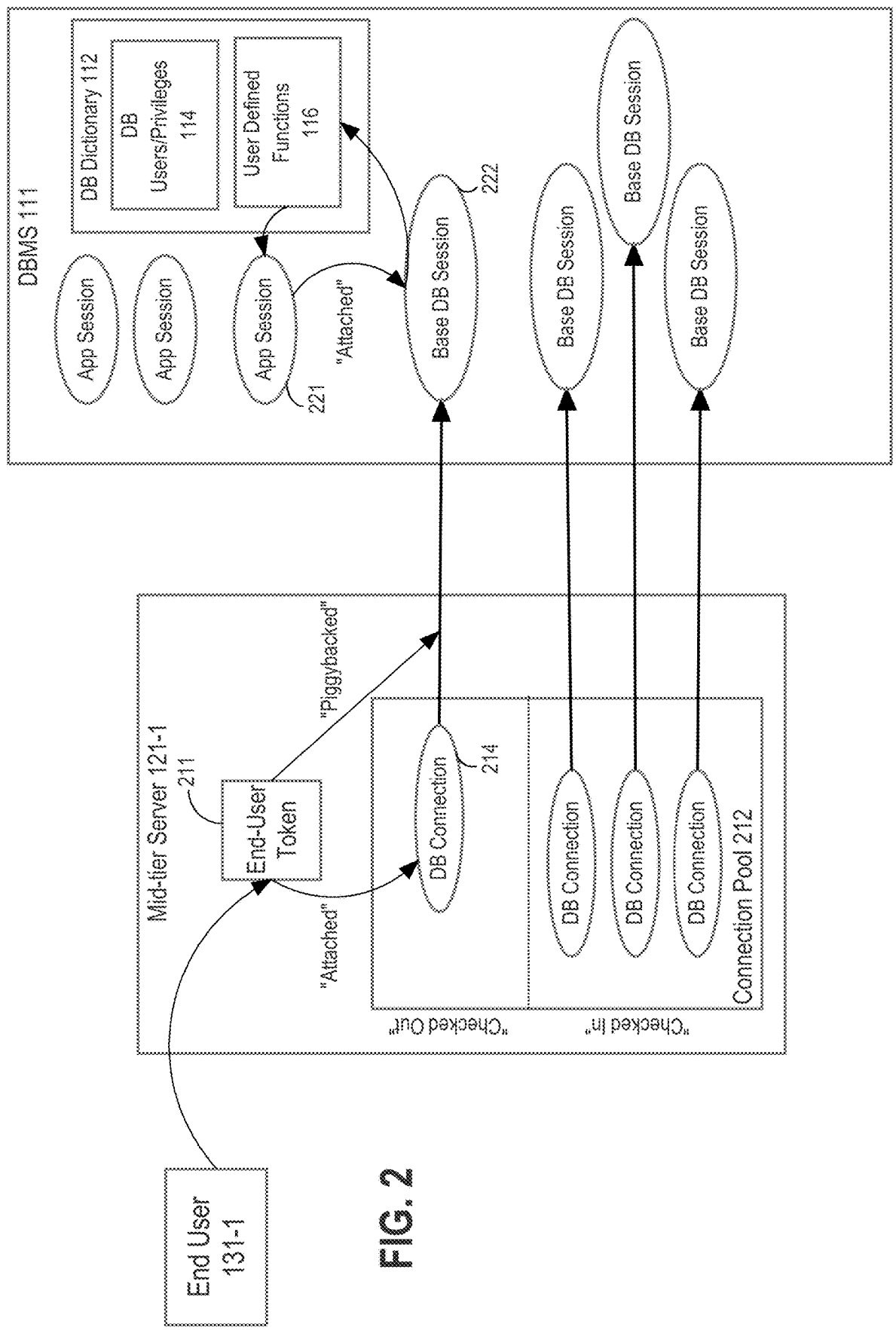
FIG. 2 is a diagram depicting aspects of the multi-tier architecture in greater detail.

FIG. 2 depicts Mid-tier Server 121-1, DBMS 111, and End User 131-1 in more detail. Mid-tier Server 121-1, DBMS 111, and End User 131-1 are used to illustrate mid-tier servers, DBMSs, and end users, respectively, in embodiments of the present invention.

Mid-tier Server 121-1 includes Connection Pool 212, which comprises multiple database connections. Each database connection is connected to a respective base database session on DBMS 111.

End User 131-1 is connected to Mid-tier Server 121-1 and sends end-user requests to Mid-tier Server 121-1. End User 131-1 has been authenticated by Mid-tier Server 121-1. In response to Mid-tier Server 121-1 authenticating End User 131-1, Mid-tier Server 121-1 generates End-User Token 211. An end user token includes principle data that identifies an end user. The end user may correspond to a database user that DBMS 111 associates with database privileges. Principle data may include several fields that identify an end user, such as a string name and numeric identifier. DBMS 111 may map one or more of values of these fields to database privileges of a database user.

An end user token may be digitally signed by Mid-tier Server 121-1 and thus includes a digital signature generated by Mid-tier server 121-1 using a private key. The private key or a corresponding public key may be used to validate an end user token based on the digital signature. An example of an end user token is a JASON Web Token.

Once Mid-tier Server 121-1 generates End-User Token 211, Mid-tier Server 121-1 returns End-User Token 211 to End User 131-1. End User 131-1 sends End-User Token 211 in subsequent end user requests sent to Middle Tier 120, which may be received by Mid-tier Server 121-1 or other of Mid-tier Servers 121. Any of these mid-tier servers may authenticate End User 131-1 using End-User Token 211 sent in conjunction with the end user request. Such authentication may include validating the digital signature in End-User Token 211.

Mid-tier Server 121-1 checks out Database Connection 214 for End User 131-1. In response to checking out Database Connection 214 for End User 131-1, Mid-tier Server 121-1 attaches End-User Token 211 to Database Connection 214. When sending a database request using a database connection, Mid-tier Server 121-1 sends the End-User Token 211 along with the request using a piggyback mechanism.

When DBMS 111 first receives End-User Token 211 along with a database request sent to Base Database Session 222, DBMS 111 creates an Application Session 221 and attaches Application Session 221 to Base Database Session 222. An adjunct security context in Application Session 221 specifies database privileges for End User 131-1. The adjunct security context specifying the database privileges is generated by invoking a user-defined function previously registered by administrators of DBMS 111. The user-defined function is a database object defined by Database Dictionary 112. A user-defined function called by DBMS 111 to generate information for an adjunct security context is referred to herein as an application session callback (ASC) function.

Database Dictionary/Privileges

A database dictionary, such as Database Dictionary 112, defines database objects in a database managed by DBMS 111. Database objects include tables, table columns, views, database users, database privileges, and user-defined functions. A database dictionary includes metadata that, for each database object of a database, defines the database object and the properties of the database objects.

According to an embodiment, database privileges are grouped into sets of database privileges referred to herein as database roles or simply roles. Database Dictionary 112 defines roles and, for each, the respective one or more database privileges of the role. A role may be defined to have specific database privileges and/or to include one or more other roles, thereby subsuming the database privileges of the one or more other roles.

Database dictionary 124 defines the database privileges of users by specifying one or more roles for the database user and/or by specifying specific database privileges. For example, for a defined database user named John Doe, Database Dictionary 112 specifies the role Accounting IT. For the role Accounting IT, Database Dictionary 112 defines full access privileges to database objects used for accounting applications. In addition, Database Dictionary 112 may define DML privileges for an IT Ticket table for database user John Doe.

The database dictionary definition of database privileges associates names with the database privileges. Database privileges may be defined for database users by issuing DDL statements that reference the names. The DDL statements may also specify argument values for arguments of the database privileges. An adjunct security context may be data that specifies the database privileges by their respective names using key-value pairs that identify the database privileges and any argument values for the database privileges.

Readying Database Connection for Connection to DBMS

Figure 3:
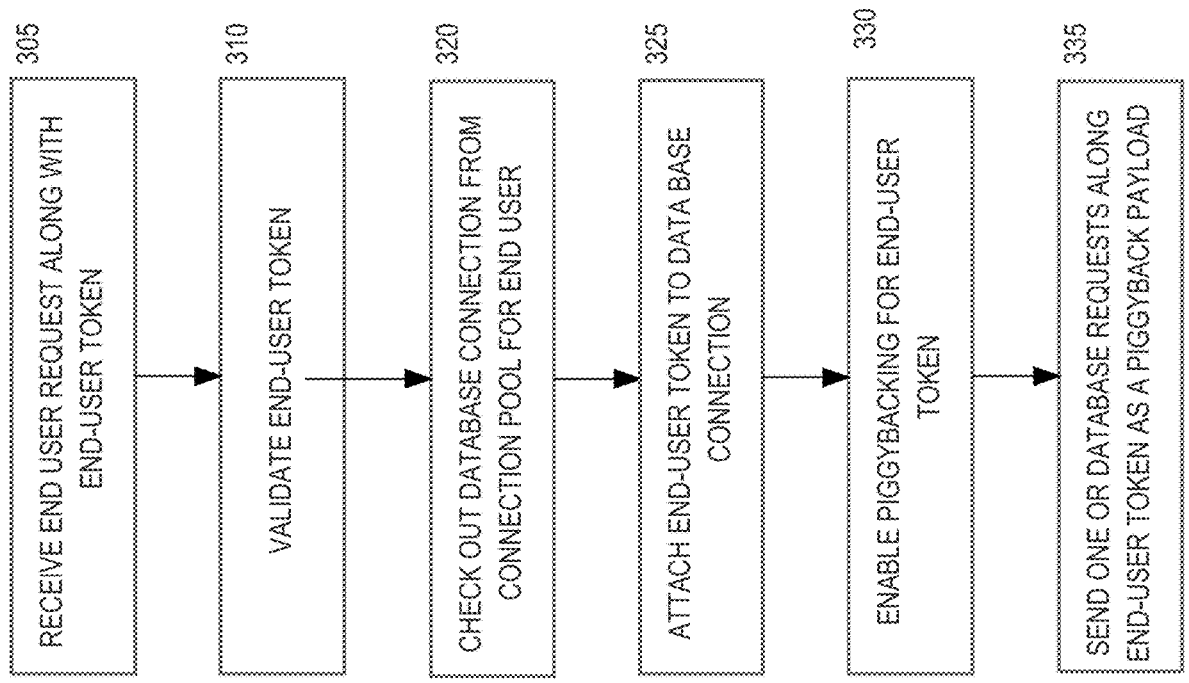
FIG. 3 is a diagram that depicts a procedure used by the middle tier and to ready a database connection for access to a DBMS by an end user according to an embodiment of the present invention.

FIG. 3 depicts a procedure used by the middle tier to ready a database connection for access to a DBMS by an end user according to BASM. The procedure is illustrated using Mid-tier Server 121-1 and DBMS 111.

Referring to FIG. 3, (305) Mid-tier Server 121-1 receives an end-user request that includes End-User Token 211. In the current illustration, End-User Token 211 was generated by any mid-tier server in Middle Tier 120, as described earlier. (310) Mid-tier Server 121-1 then validates the End-User Token 211 by validating the digital signature of End-User Token 211.

(320) Mid-tier Server 121-1 checks out a Database Connection 214 for End User 131-1. (325) Mid-tier Server 121-1 attaches the End-User Token 211 to Database Connection 214. Attaching an end-user token to a database connection in effect renders the respective end user of the token as the database connection's end user. The attachment may be accomplished using any approach for associating an end-user token with a database connection. Mid-tier Servers 121 may generate data in memory associating a database connection with an end-user token. Alternatively, a property of the database connection may refer to the end-user token.

(320) Mid-tier Server 121-1 then enables a piggyback mechanism for piggybacking End-User Token 211 to any database request issued through Database Connection 214. Once enabled, the piggyback mechanism sends payload data along with any database request issued through a database connection.

Specifically, a database connection may be configured to piggyback multiple piggyback payloads. Each is associated with a piggyback ID. Enabling a piggyback payload includes setting the connection to retrieve and send data in memory, such as an end-user token, as a piggyback payload associated with that piggyback ID. When a database request is received by a DBMS through a database session, the DBMS also receives any piggyback payload and the respective piggyback ID associated with each piggyback payload.

(335) The Mid-tier server 121-1 sends one or more database requests to DBMS 111 to Base Database Session 222. These requests may be database requests specified in end-user requests sent by End User 131. For example, the end-user requests may specify database statements to execute. Mid-tier Server 121-1 sends database requests to DBMS 111 through the Database Connection 214 to Base Database Session 222, the database requests specifying to execute the database statements. Because the piggyback mechanism for piggybacking End-User Token 211 is enabled, End-User Token 211 is piggybacked to each database request.

Creating/Attaching Application Session

Figure 4:
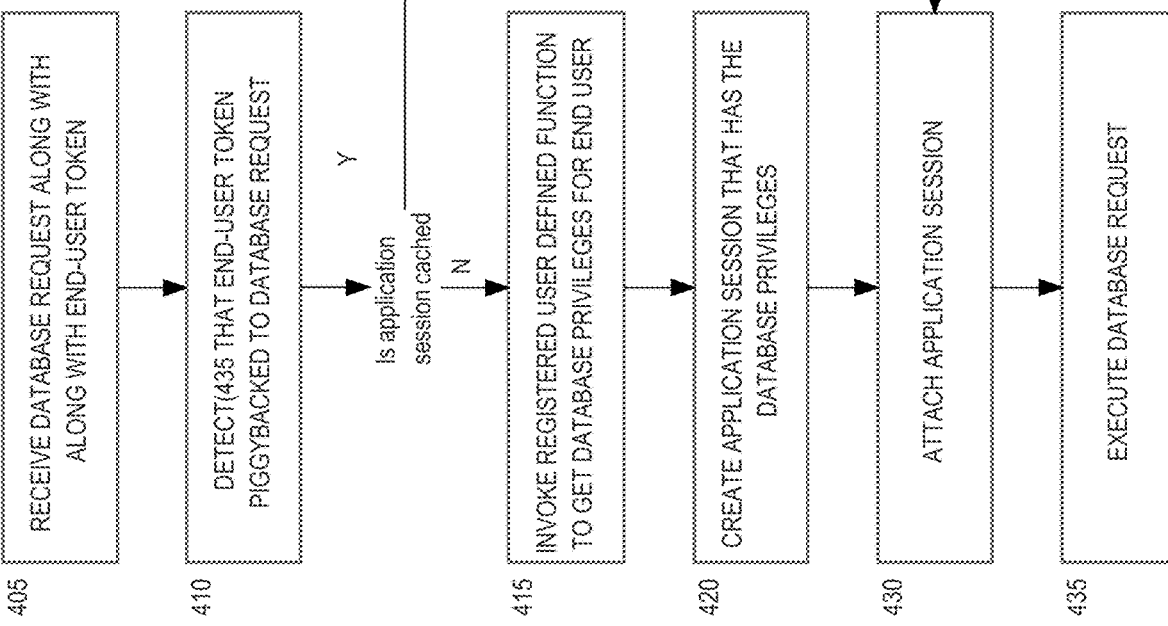
FIG. 4 is a diagram that depicts a procedure performed for creating and/or attaching application sessions, according to an embodiment of the present.

FIG. 4 depicts a procedure performed for creating and/or attaching application sessions under BASM, according to an embodiment of the present invention. The procedure is illustrated by continuing the illustration above.

(405) DBMS 111 receives within Base Database Session 222 a database request from Mid-tier Servers 121 issued through Database Connection 214. The End-User Token 211 is received as a piggybacked payload identified by the piggyback ID for end-user tokens.

In an embodiment, Middle Tier 120 and DBMS Tier 110 operate in a trust domain such that database requests sent by Middle Tier 120 are not authenticated, irrespective of the end users on whose behalf the database requests are sent. In an embodiment, the database requests are authenticated by the DBMS Tier 110. For example, end-user tokens piggy-backed to database requests may include a digital signature. DBMS 111 may authenticate the end-user tokens by validating the digital signature of each of the end-user tokens.

(410) DBMS 111 detects that DBMS 111 received an End-User Token 211 along with the database request received through Base Database Session 222. Specifically, DBMS 111 detects that it received a piggyback payload having the piggyback ID for end-user tokens. DBMS 111 is configured to treat a piggy payload having that piggyback ID as an end-user token for an application session.

Next, DBMS 111 determines whether DBMS 111 has cached an application session for End-User Token 211. After creating an application session, DBMS retains the application session in a cache after detachment for possible re-use in subsequent database requests that piggyback the end-user token for which the application session was created. In the current illustration, DBMS 111 determines there is no application session in the cache for End-User Token 211.

(415) In response to detecting that End-User Token 211 was received as piggyback payload and has determined there is no application session attached for End-User Token 211, DBMS 111 invokes the registered ASC function. The registered ASC function returns an adjunct security context.

(420) DBMS 111 creates an Application Session 221. Application Session 221 includes the adjunct security context.

(430) DBMS 111 attaches Application Session 221 to Base Database Session 222. Hence, the session security context of Base Database Session 222 is thus incorporated with the just created adjunct security context. At this stage, the now augmented Base Database Session 222, in which runs a database process, may be referred to as Application Session 221.

(435) The database request is executed. It is executed within the context of Application Session 221 by the database process, which includes the adjunct security context. When a database process executes within the context of an application session, the database commands and the database operations that can be performed are restricted according to the session security context of the application session and the respective adjunct security context.

Before attachment to Application Session 221, the session security context of Base Database Session 222 specified far more sweeping database privileges than the adjunct security context. For example, the sweeping database privileges may have provided the privilege to read and modify a large number of database objects (e.g. tables), while adjunct security context limits access to read and modify privileges to a much smaller number of these database objects.

Flexibility of ASPS

A DBMS stores data for applications. In general, application developers for applications include developers that develop database objects used by the application. These application developers may also develop ASCs that provide the backend security desired for the applications.

ASPs provide a powerful mechanism that enables ASCs to be easily customized. In general, the adjunct security context returned by an ASC must identify database privileges (e.g., roles) that are defined by the DBMS. However, an ASC may be implemented with customized logic that determines the database privileges that are appropriate for the respective end-user token. It is not even necessary that the end user corresponding to the end-user token be defined as a database user.

ASPs may be configured to interface with an external identity provider. An identity provider is an application or component of an application that authenticates end users and/or provides data about the access privileges of the end user. The application can be hosted on a server outside the middle tier or DBMS tier.

An identity provider need not specify database privileges using the same format and syntax of a DBMS or using privileges that closely correspond or mirror database privileges defined by the DBMS. An ASC may be developed to derive database privileges for an end user based on data provided by the identity provider. Alternatively, an ASC may return the data to the DBMS and the DBMS derives the database privileges and generates the adjunct security context.

In an embodiment, the middle tier may generate an adjunct security context. The adjunct security context can be included in an end-user token or in a separate piggyback payload associated with a different piggyback ID than that used for an end-user token.

Implementation of BASM is transparent to applications developed to execute in the end tier. Developers of end tier applications may focus only on business logic of their end tier applications and not backend security. In fact, BASM may not be circumvented by typical application developers, that is, application developers who are not responsible for implementing ASC and/or database privileges in the DBMS tier.

DBMS Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Transaction Processing Overview

In transaction processing, changes to persistent data objects are made by transactions. A transaction is a set of operations that change persistent data objects. All the changes for a transaction are made atomically. The changes are made permanent by committing the transaction. If the transaction cannot be committed, or is aborted or otherwise not committed, the transaction is rolled back.

Transaction processing, as the term is used herein, also requires journaling. In journaling, changes made by a transaction to a persistent data object are stored in a persistent journal. A persistent journal comprises journal records that record changes made by a transaction to a data object. Each record may specify what field, column, elements, or portion of a data object were changed and the new values thereof created by the change. The old values that were replaced by the new value may also be specified.

In write-ahead journaling, journal records for changes made by a transaction are stored persistently before committing a transaction and/or to reach a prepared state. In addition, the journal can be read by other PSSs to replicate persistent data objects.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
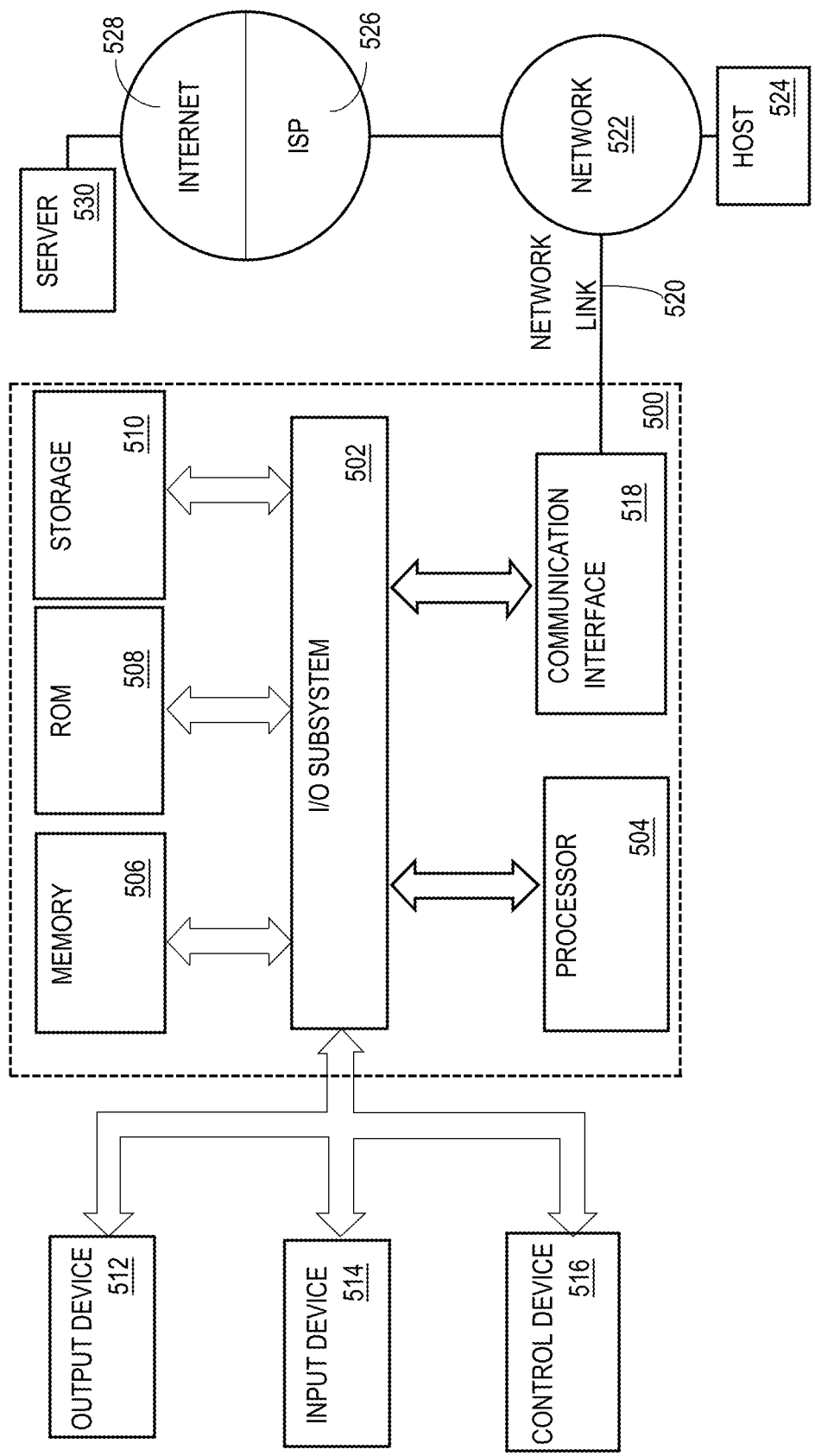
FIG. 5 is a diagram depicting a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
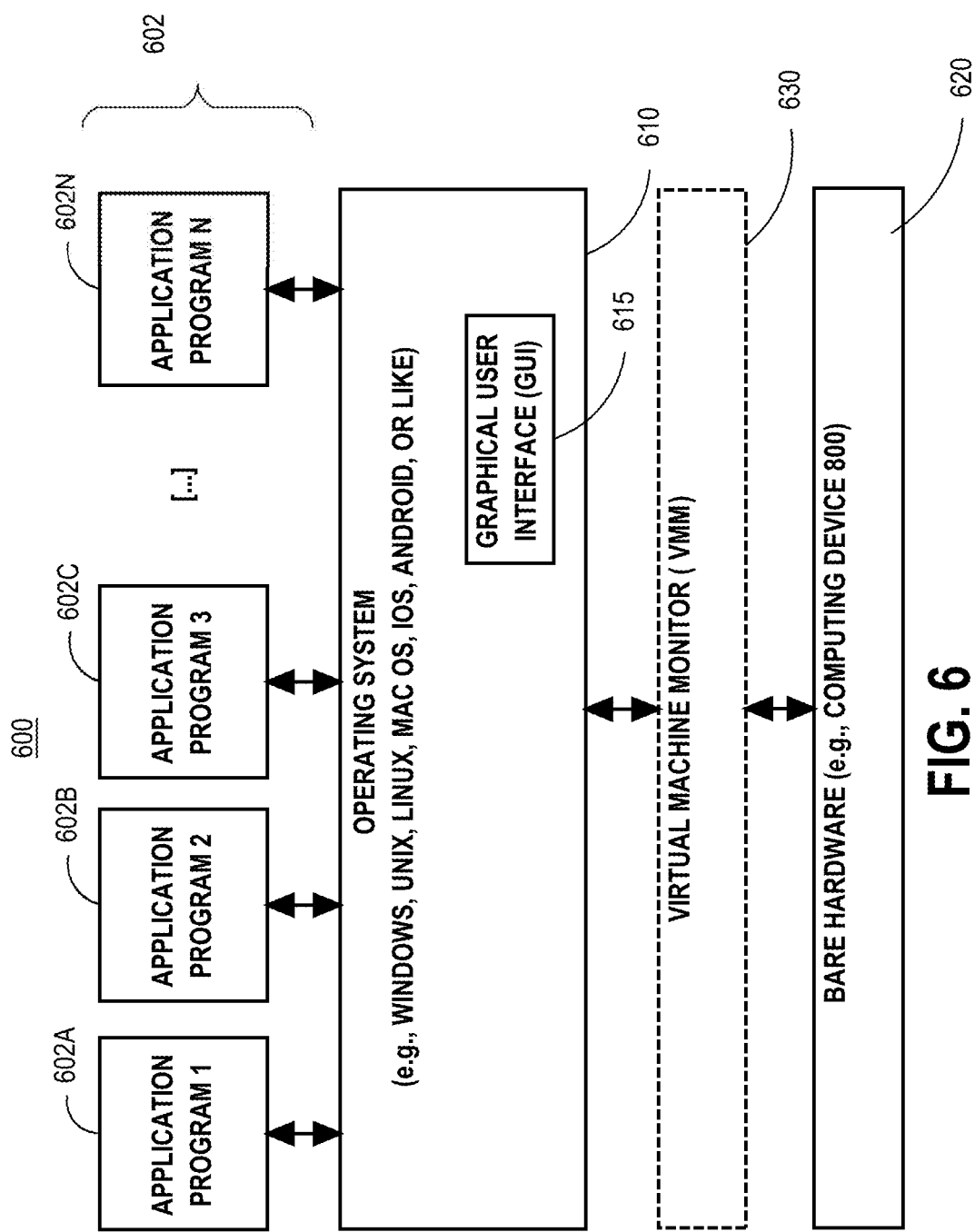
FIG. 6 depicts a software system that may be employed for controlling the operation.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 1106 and on fixed storage (e.g., hard disk or flash memory) 1110, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 1110 into memory 1106) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 1104) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    a DBMS receiving a database request to execute a database command, wherein said database request includes a first piggyback payload, said first piggyback payload including an authenticated end-user token;
    said DBMS creating an application session based on said end-user token, said application session including an adjunct security context specifying first database privileges;
    attaching said application session to a base database session, said base database session specifying second database privileges, said base database session including a database process;
    said database process executing said database command according to said first database privileges specified in said first adjunct security context.

2. The method of claim 1, wherein creating said application session based on said end-user token includes creating said adjunct security context based on said end-user token.

3. The method of claim 2, wherein creating said adjunct security token based on said end-user context includes invoking a user-defined function that returns data specifying said first database privileges.

4. The method of claim 1, wherein said first database privileges are defined by a database dictionary of said DBMS.

5. The method of claim 1, wherein:
    a middle tier includes one or more mid-tier servers, wherein said one or more mid-tier servers include said mid-tier server; and wherein the method further includes the step of said middle tier authenticating said end-user token.

6. The method of claim 1, the method further including:
a middle tier authenticating an end user;
in response to authenticating said end user, said middle tier generating said end-user token for said end user;
transmitting said end-user token to said end user; and
said middle tier server receiving said end-user token from said end user with an end user request, said database request being generated for said end user request.

7. The method of claim 6, wherein said middle tier authenticating said end user includes using an identity provider to authenticate said end user.

8. The method of claim 7, the method further including said DBMS using said identity provider to obtain said data reflecting said first database privileges.

9. The method of claim 7, the method, wherein:
creating said application session based on said end-user token includes creating said adjunct security context based on said end-user token;
the method further includes:
using said identity provider to obtain data reflecting said first database privileges; and
creating said adjunct security context based on said data reflecting said first one or more database privileges.

10. The method of claim 1, wherein creating said adjunct security context based on said end-user token includes invoking a user-defined function that returns data specifying said first database privileges, wherein said user-defined function is defined by a database dictionary of said DBMS.

11. One or more non-transitory computer-readable media storing one or more sequences of instructions that, when executed by one or more processors, cause:
a DBMS receiving a database request to execute a database command, wherein said database request includes a first piggyback payload, said first piggyback payload including an authenticated end-user token;
said DBMS creating an application session based on said end-user token, said application session including an adjunct security context specifying first database privileges;
attaching said application session to a base database session, said base database session specifying second database privileges, said base database session including a database process; and
said database process executing said database command according to said first database privileges specified in said first adjunct security context.

12. The one or more non-transitory computer-readable media of claim 11, wherein creating said application session based on said end-user token includes creating said adjunct security context based on said end-user token.

13. The one or more non-transitory computer-readable media of claim 12, wherein creating said adjunct security token based on said end-user context includes invoking a user-defined function that returns data specifying said first database privileges.

14. The one or more non-transitory computer-readable media of claim 11, wherein said first database privileges are defined by a database dictionary of said DBMS.

15. The one or more non-transitory computer-readable media of claim 11, wherein:
a middle tier includes one or more mid-tier servers, wherein said one or more mid-tier servers include said mid-tier server; and
wherein the one or more sequences of instructions include instructions that, when executed by said one or more processors, cause said middle tier authenticating said end-user token.

16. The one or more non-transitory computer-readable media of claim 11, wherein the one or more sequences of instructions include instructions that, when executed by said one or more processors, cause:
a middle tier authenticating an end user;
in response to authenticating said end user, said middle tier generating said end-user token for said end user;
transmitting said end-user token to said end user; and
said middle tier server receiving said end-user token from said end user with an end user request, said database request being generated for said end user request.

17. The one or more non-transitory computer-readable media of claim 16, wherein said said middle tier authenticating said end user includes using an identity provider to authenticate said end user.

18. The one or more non-transitory computer-readable media of claim 17, wherein the one or more sequences of instructions include instructions that, when executed by said one or more processors, said DBMS using said identity provider to obtain said data reflecting said first database privileges.

19. The one or more non-transitory computer-readable media of claim 17, wherein:
creating said application session based on said end-user token includes creating said adjunct security context based on said end-user token;
the method further includes:
using said identity provider to obtain data reflecting said first database privileges; and
creating said adjunct security context based on said data reflecting said first one or more database privileges.

20. The one or more non-transitory computer-readable media of claim 11, creating said adjunct security context based on said end-user token includes invoking a user-defined function that returns data specifying said first database privileges, wherein said user-defined function is defined by a database dictionary of said DBMS.

* * * * *